(No Model.) 6 Sheets—Sheet 1.

H. A. HOUSEMAN.
STOPPING MECHANISM FOR CIRCULAR KNITTING MACHINES.

No. 517,045. Patented Mar. 27, 1894.

WITNESSES:

INVENTOR:

(No Model.) 6 Sheets—Sheet 2.
H. A. HOUSEMAN.
STOPPING MECHANISM FOR CIRCULAR KNITTING MACHINES.
No. 517,045. Patented Mar. 27, 1894.

WITNESSES: INVENTOR:

(No Model.) 6 Sheets—Sheet 3.
H. A. HOUSEMAN.
STOPPING MECHANISM FOR CIRCULAR KNITTING MACHINES.
No. 517,045. Patented Mar. 27, 1894.

WITNESSES: INVENTOR:

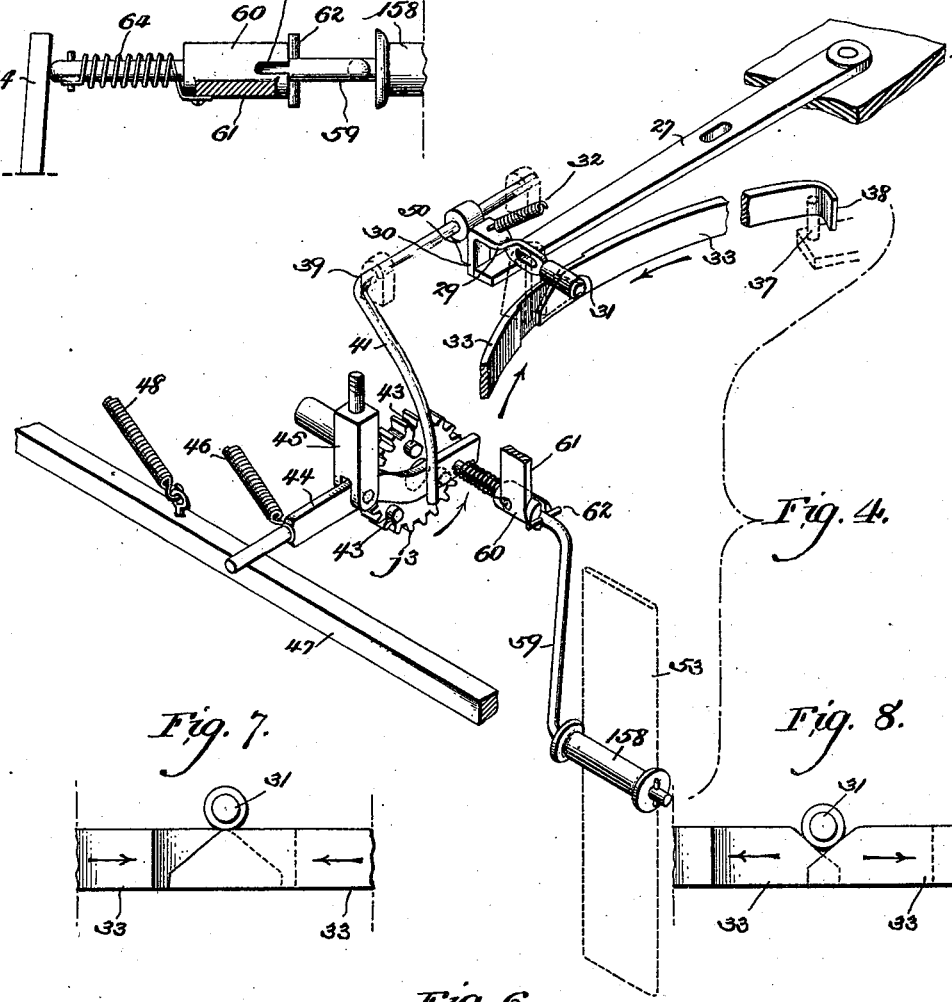

(No Model.) 6 Sheets—Sheet 5.
H. A. HOUSEMAN.
STOPPING MECHANISM FOR CIRCULAR KNITTING MACHINES.
No. 517,045. Patented Mar. 27, 1894.

WITNESSES: INVENTOR:

(No Model.)  6 Sheets—Sheet 6.
H. A. HOUSEMAN.
STOPPING MECHANISM FOR CIRCULAR KNITTING MACHINES.
No. 517,045. Patented Mar. 27, 1894.
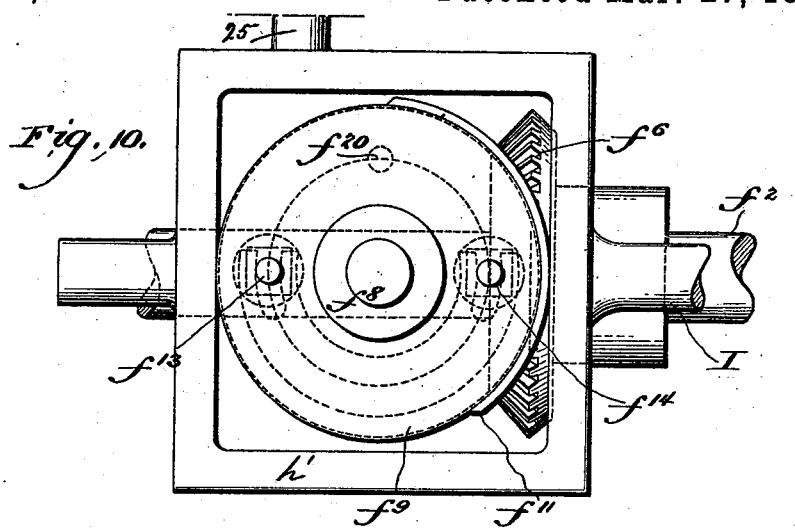
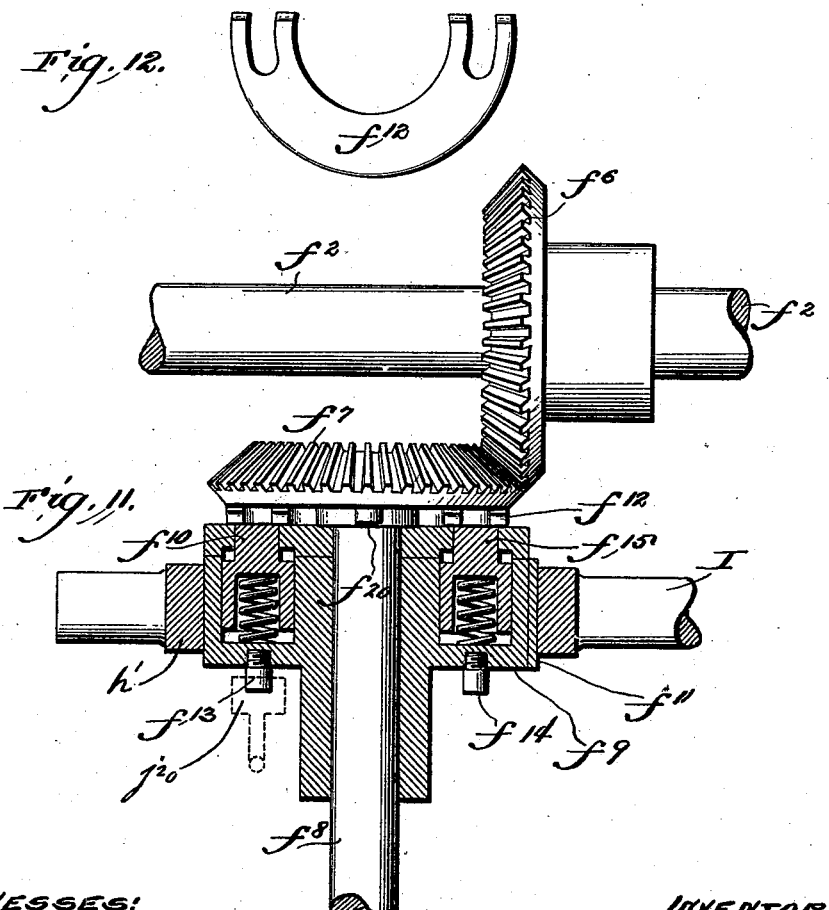

UNITED STATES PATENT OFFICE.

HARRY A. HOUSEMAN, OF PHILADELPHIA, PENNSYLVANIA.

STOPPING MECHANISM FOR CIRCULAR-KNITTING MACHINES.

SPECIFICATION forming part of Letters Patent No. 517,045, dated March 27, 1894.

Application filed September 11, 1893. Serial No. 485,262. (No model.)

*To all whom it may concern:*

Be it known that I, HARRY A. HOUSEMAN, a citizen of the United States, residing at Philadelphia, county of Philadelphia, and State of Pennsylvania, have invented a new and useful Improvement in Stopping Mechanism for Circular-Knitting Machines, of which the following is a full, clear, and exact description, reference being had to the accompanying drawings, which form a part of this specification.

My improvements relate specifically to that part of the mechanism which controls and operates the needles during the formation of other than tubular goods or when the cylinder is reciprocating and, in case said mechanism fails to register, and operate correctly, stops the operation of the machine.

It also consists in certain mechanism which automatically causes the machine to stop when a thread breaks, and the loops are carried off the needles, all of which will hereinafter be fully pointed out.

I will describe the machine in detail, and in connection therewith point out my improvements.

Figure 1:
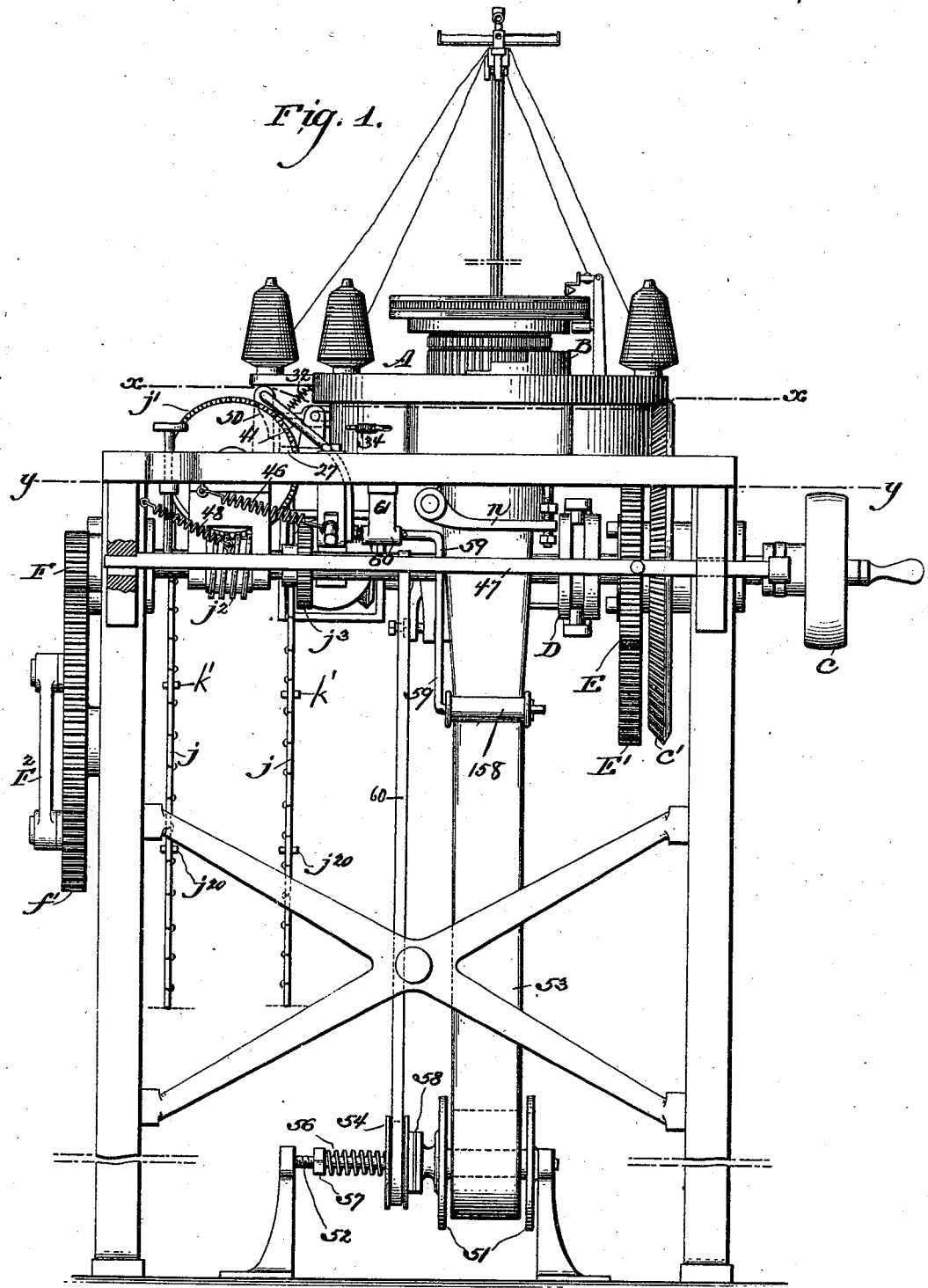
Figure 2:
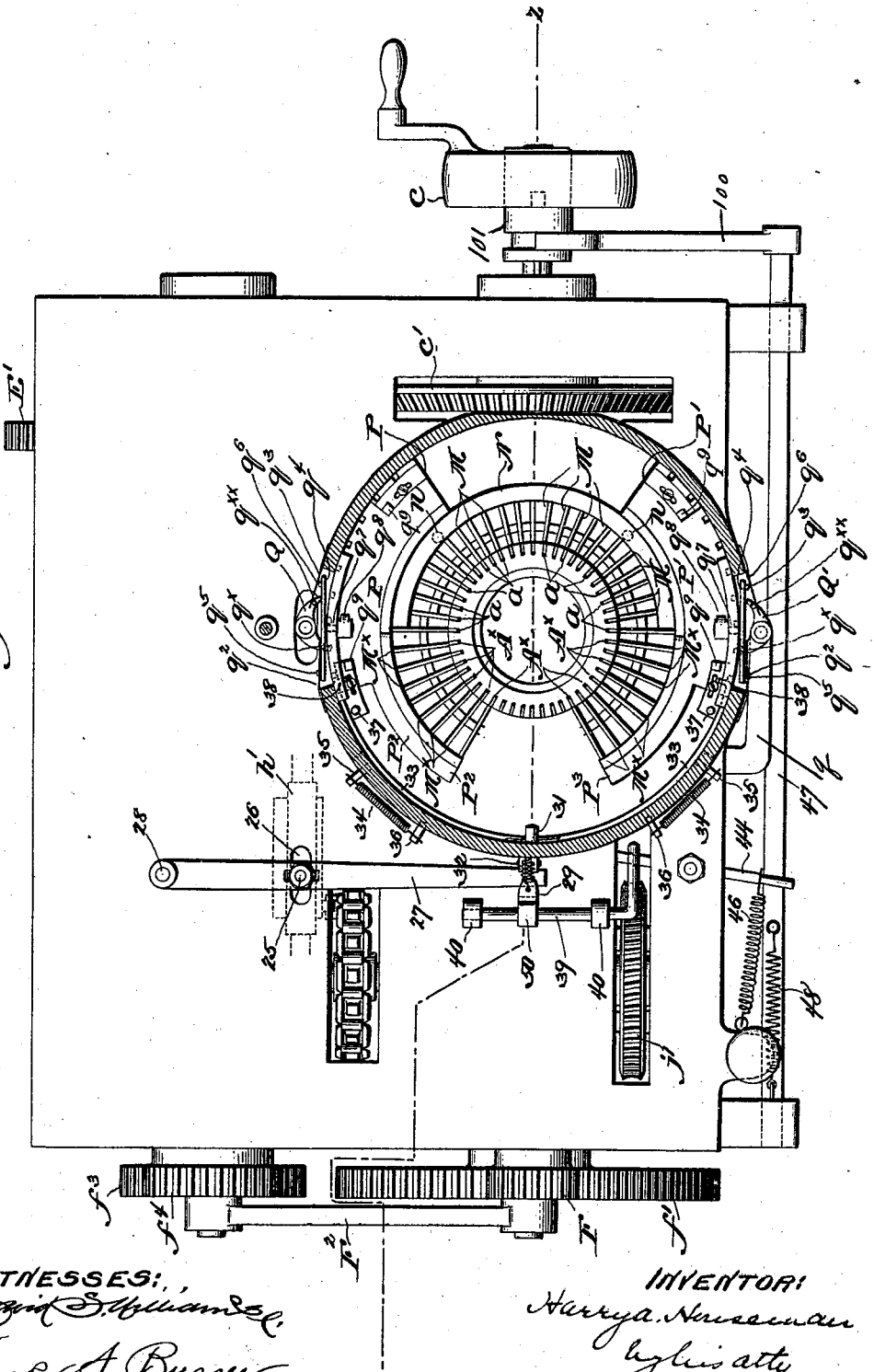
Figure 3:
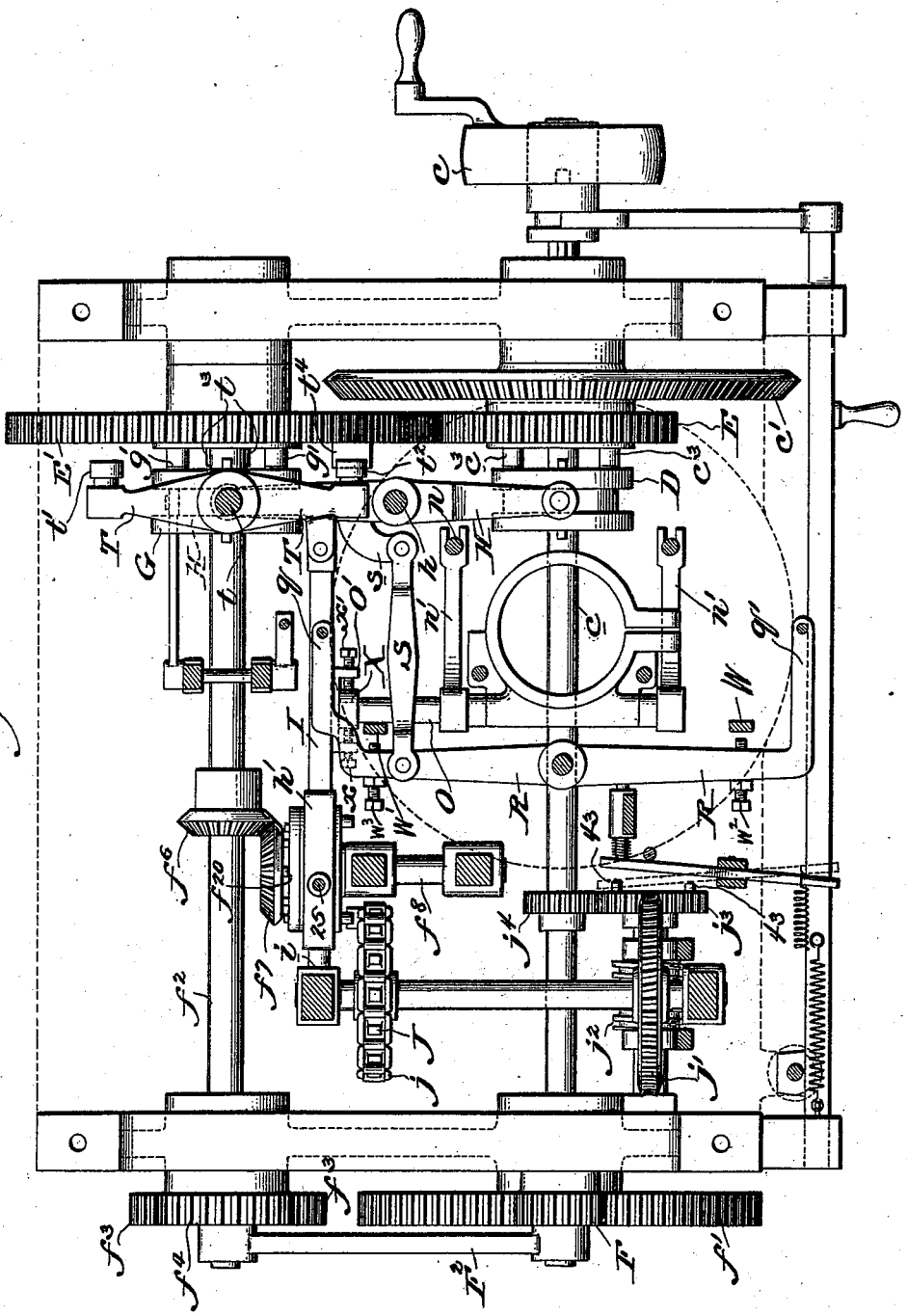
Figure 9:
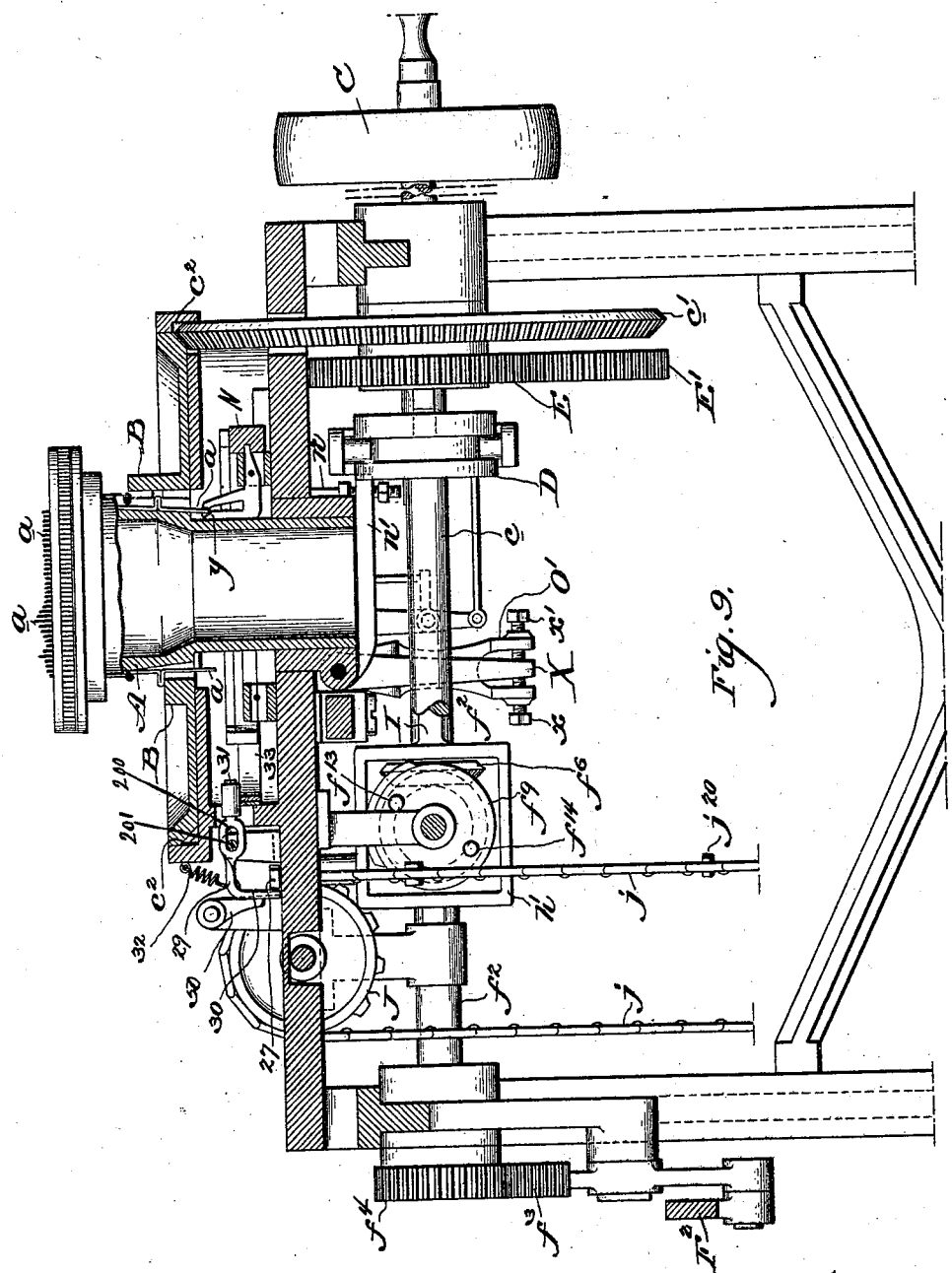

In the drawings—Figure 1 is a front elevation. Fig. 2 is a section on line $x$—$x$, Fig. 1. Fig. 3 is a section on line $y$—$y$, Fig. 1. Fig. 4 is a detached perspective view of part of my improved mechanism. Fig. 5 is a detached sectional plan view of a portion of the mechanism shown in Fig. 4. Fig. 6 is a detached end view of a portion of the mechanism shown in Fig. 4. Figs. 7 and 8 are diagrammatic views showing the operation of the roller 31. Fig. 9 is a section on the line $z$—$z$ of Fig. 2. Figs. 10, 11 and 12 are details of parts shown in Figs. 3 and 9.

A is the needle cylinder, in which are the needles $a$.

B is the knitting cylinder carrying the operating cams, as in the ordinary machine.

C is the driving pulley.

$c$ is the main driving shaft.

$c'$ is a bevel gear loose on the main driving shaft and engaging the rack $c^2$ on the knitting cylinder.

D is a clutch member feathered on the main driving shaft.

$c^3$ $c^3$ are lugs on the hub of the bevel gear, $c'$, and the clutch D is adapted to engage said lugs, $c^3$ $c^3$, so that when said clutch is in engagement with the bevel gear, $c'$, the cam cylinder is rotated.

In making the heel and toe of a stocking, the cam cylinder, in place of being rotated, is reciprocated, and this is accomplished in the following manner: Secured to one end of the shaft, $c$, is a pinion, F, which engages with the gear wheel, $f'$. Pivoted to the gear wheel, $f'$, is a connecting rod, $F^2$, one end of which is carried by the lower portion of the segmental rack, $f^3$, which meshes with the pinion, $f^4$, on the shaft, $f^2$. Upon the other end of this shaft, $f^2$, is the clutch member, G, adapted to engage with the lugs, $g'$ $g'$, upon the gear wheel, E', the gear wheel, E', working in the gear wheel, E, which is keyed to the hub of the bevel gear wheel, $c'$, so that they revolve together. Upon the shaft, $f^2$, is the bevel wheel, $f^6$, which meshes with the bevel wheel, $f^7$, loose on the shaft, $f^8$. This bevel wheel, $f^7$, is provided with a pin, $f^{20}$. $f^9$ is a clutch roller provided with spring actuated pins, $f^{10}$, said roller having a raised or cam portion, $f^{11}$, said roller, $f^9$, being fixed to the shaft, $f^8$. Between the roller, $f^9$, and the bevel gear, $f^7$, is the segmental shield, $f^{12}$, held in firm position by being secured fixedly to the bed of the machine; the pins, $f^{10}$ and $f^{15}$, resting against the solid portion of said shield, while the pin, $f^{20}$, reciprocates in the open portion. Upon the roller, $f^9$, are the lugs, $f^{13}$ and $f^{14}$.

H is a clutch lever pivoted at $h$ and having forked ends which encircle the clutches G and D, and as may be readily seen, the construction and arrangement are such that when it is operated, it throws one clutch into connection and the other clutch out of connection. This lever H is operated in the following manner: I is the connecting rod, one end being connected to the clutch lever H. This rod has connected to it or formed with it the frame, $h'$, which surrounds the clutch roller, $f^9$, as shown in detail in Figs. 10 and 11. The other end of this rod has a bearing at $i$.

J is a sprocket wheel upon which travels the sprocket chain $j$. This sprocket wheel is driven in the following manner: Upon the shaft of the sprocket wheel J is the worm wheel $j'$, driven by the worm $j^2$, the worm $j^2$ being on the same shaft as the gear wheel, $j^3$, which is driven by the gear wheel, $j^4$, upon the main driving shaft. The sprocket-wheel is thus continuously driven, carrying around it the sprocket-chain, $j$. The position of the clutch lever, H, at the commencement of knitting is such that the clutch, D, is in engagement with the bevel-gear, $c'$, and the knitting cylinder is rotated. Upon the sprocket chain, $j$, is the lug, $j^{20}$, and upon the clutch-roller, $f^9$, are two lugs, $f^{13}$ $f^{14}$. The lug, $j^{20}$, strikes the lug, $f^{13}$, turning the roller, $f^9$, until that portion of the roller in which is the pin $f^{10}$ is brought beyond the shield, when the pin $f^{10}$, no longer held in by the shield, flies outward in line with the movement of pin $f^{20}$, and when it is struck by said pin the clutch roller is turned one half revolution, the cam portion $f^{11}$ thereof acting upon the frame, which moves the connecting rod, I, operating the clutch-rod to force the clutch G into connection with the gear wheel, E', and moves the clutch, D, out of engagement with the bevel gear, $c'$, which causes the bevel-gear to reciprocate, thus reciprocating the knitting cylinder, the pin, $f^{20}$, on the bevel-gear, $f^7$, having pushed the pin, $f^{10}$ into engagement with the other end of the shield. The clutch roller moves but one half revolution, as when it turns the half revolution the pins $f^{10}$ and $f^{15}$ have changed places, and both, under the influence of the shield, are held in the slots in the roller. The clutch remains in this position, the cam roller resting against the frame and locking it in said position. The clutch is released from this position on the finishing of the heel and toe, by another lug $k'$ upon the sprocket chain striking the lug, $f^{14}$, on the clutch roller, and bringing the other spring-pin, $f^{15}$, (which is in the position formerly occupied by pin $f^{10}$ with reference to the sprocket chain) away from the cover, so that it moves outward into the open space in line with the pin on the bevel-gear, so that said pin strikes it, turning the roller another half turn, as described in reference to action of pin $f^{10}$, and the cam face of the roller acts upon the opposite side of the frame, moving the connecting rod in the opposite direction, releasing the clutch, G, and throwing the clutch, D, into engagement, when the cylinder is again rotated.

When the machine is first operated, in forming the leg of the stocking, the cam cylinder is rotated continuously, and the sprocket chain is carried around by the sprocket wheel slowly by the mechanism used, and lugs, $j^{20}$, are placed in such positions upon the chain as to strike the lug, $f^{13}$, at the points where the heel and toe are to be formed, and the lugs, $k'$, strike the lug, $f^{14}$, at the points where the heel and toe are finished.

In forming the heel and toe, as is well known, about half of the needles are thrown out of action. I accomplish this in the following manner: The needles, $a, a, a$, rest in slots in the knitting cylinder, and the shanks of the needles are inclosed in the jaws of the needle levers, M, M, each lever being pivoted and having a tail-piece. The tail-pieces of the levers, of the needles, $a$, which are to be thrown out of action simultaneously when the heel and toe are to be knitted, rest in a groove in the plate, N. This plate, N, has the pins, $n, n$, which are connected to the forked arms, $n', n'$, which forked rods are secured on the shaft, O. On the shaft, O, is the lever, X. O' is a stand which is connected to the connecting rod, I. $x, x'$, are set screws which pass through said stand in line with the lever, X, rocking the shaft, O, and moving the plate, N, lifting the end of the levers, M, M, forcing the corresponding needles out of action of the knitting cylinder. At the end of knitting the heel or toe, the other set screw, $x'$, rocks the shaft in the new direction, depressing the lever and again bringing the needles into action. The mouth or jaw of each of the levers has the inset, $y$, which supports the needle when forced in or out of action.

In knitting the heel and toe, the remainder of the needles are used, and one from each side is thrown out of action at each reciprocation of the knitting cylinder until the goods are narrowed down sufficiently; then one from each side is thrown into action until the heel or toe is completed. These needles thrown out of action in narrowing and into action in widening are called fashioning needles. I accomplish this in the following manner: $A^\times$—$A^\times$ are needles used in forming the heel and toe, although of course their number may be varied as desired. Each of these needles is inclosed in the jaws of a pivoted lever $M^\times$—$M^\times$ (see Fig. 2). $P^2, P^3$ are the fashioning needle operating cams which are connected to the rack plates $p, p'$ preferably being integral therewith, as shown. Q, Q', are two double pawls, one for each rack-plate, pivoted to supports, $q, q'$. $q^2 q^3$ are springs which act upon the pins $q^\times, q^{\times\times}$, of the pawls at each side to hold said pawls against the racks. $q^4$ is a rod having projections, $q^5, q^6$, one on each end of said rod, and said rod $q^4$, is connected to a rock-shaft, $q^7$, which extends through the plate of the machine and has a depending arm, $q^8$. The projections $q^9$ at each end of the plates P P' are adapted to strike the depending arm, $q^8$. The supports, $q, q'$, are connected, one at each end of the lever, R. S is a link, one end pivoted to the lever, R, the other end to the arm, $s$. The arm, $s$, is connected to the lever, T, pivoted at $t$ to clutch-rod, H. Upon this lever, T, are lugs, $t', t^2$, one at the outer and one at the inner end of the lever, T; and corresponding lugs, $t^3, t^4$, are upon the gear-wheel, E'. When the clutch, G, is thrown into engagement with the gear wheel, E', the lugs, $t', t^2$, are brought into the line of travel of the lugs, $t^3, t^4$, and as the gear wheel reciprocates, the lugs, $t', t^2$, are alternately struck, and the lever, T, vibrates first in one direction and then in the other, the lever, R, vibrates on its pivot point, operating upon first one pawl and then the other, the return movement drawing one pawl, and then the other back to engage the next tooth. As described in Letters Patent No. 484,738, dated October 18, 1892, the ends of the levers, $M^\times$—$M^\times$, are in line of travel of the cams, $P^2$, $P^3$, and as the cams, $P^2$, $P^3$, strike them, it lifts up the end, forcing the needle in out of action. The cams act upon first one needle, and then the next, until the last tooth is reached, when one of the projections, $q^9$, on each cam strikes the arm, $q^8$, which turns the shaft so that the pin, $q^5$, is released from engagement with its corresponding spring, and the other pin $q^6$ forced against its corresponding spring, thus rendering one spring inactive and the other active, turning the pawl from the position it was in and rendering the other end of the pawl active. Further movements reverse the racks, depressing one by one on each side the ends of the levers $M^\times$—$M^\times$, bringing the needles forward and into action, one by one, until the last tooth in the rack is reached, when by means hereinbefore described the pawl is turned and the other end of the pawl rendered active. When the rod, I, is operated, as described, and the clutch, G, thrown out of action, the lugs, $t'$, $t^2$, are drawn out of line of the lugs, $t^3$, $t^4$. Upon the plate of the machine are secured the guards, W, W', and set screws, $W^2$, $W^3$, pass through the rod, R, so that the throw of the rod, R, may be limited. Connected to the frame, $h'$, is a stud, 25, which passes through a slot, 26, in the frame of the machine, and connected to said stud is the lever, 27, pivoted at 28, to the frame of the machine, the other end of the lever being free and resting adjacent to a trip, 29, mounted to slide and swing vertically by means of the slot 200 and pin 201, see Fig. 9, one end of which has the angle piece, 30, the other end having the roller, 31 (see Fig. 4). 32 is a coil spring connected so as to act to force said roller 31 downward. 33 are two strap metallic pieces, one end of each being beveled and adapted to overlap each other, and form a seat or support for roller, 31. 34 are springs, one end connected to the pin, 35, which passes into the strap piece, 33, the other end connected to pin 36, passing into the bed ring of the machine, the tendency of the springs being to draw the two strap pieces, 33, together and into the position shown in Fig. 4. Upon each of the rack plates, P, P', is a pin, 37, in such position as to be in alignment with the inward projection, 38, at one end of each of the strap pieces. 39 is a shaft secured in bearings, 40, and, adapted to rock upon said shaft, is secured a lug, 50, in alignment with the angle piece, 30, the shaft, 39, having the crank arm, 41. $j^3$ is a gear having upon its face the pins, 43, said gear being driven as before stated by a gear, $j^4$, on the main shaft, c. 44 is a lever pivoted in support 45, pivotally secured to the frame of the machine, one end of said lever being bent and in alignment with crank arm, 41. 46 is a coil spring one end secured to lever, 44, and the other end to the frame of the machine, and tending to hold the lever, 44, away from the pins. 47 is the shifting bar of the machine connected to forked clutch rod 100 which surrounds the clutch 101 feathered on the main driving shaft, and C is the driving pulley loose on the said shaft and by movement of clutch the pulley is engaged with or disengaged from the shaft, the end of said shifting bar being offset, and when held up by the spring, 48, the offset is held against the top of the slot in the frame. The shifting bar is in alignment with the end of lever 44. The pins, 37, upon the rack plates, P, P', are set at such points that they strike against the main projection, 38, of the strap pieces in the forward movement only when the pawls are acting on the last teeth, and the movement is only sufficient to move said strap pieces apart. The lever 27 being connected to the frame, $h'$, has a corresponding motion imparted, and when the frame is operated to throw the oscillating shaft into action, the lever is moved toward the cylinder; and when it is operated to allow the rotating shaft to come into action the lever is moved to the left. It sometimes, more or less frequently, occurs that in operating the machine the pawls will fail to catch all the teeth in one of the rack plates, in which case, the knitting at that point is irregular, and the plates are in such position to each other and the work as to operate irregularly and imperfectly. When the racks and pawls operate correctly, the operation of the pawls upon the last teeth of the racks at the conclusion of the formation of the heel and toe draws the two strap pieces away from each other, and the roller, 31, drops down, so that the angle piece, 30, is lifted up, out of line with the lever, 27, and is not struck by it when it moves in that direction, which occurs when the frame, $h'$, is operated to throw out the reciprocating shaft, and at the end of the heel and toe knitting. But, if, for any cause, one or the other of the pawls should fail to act upon a tooth on the rack plates, then, as all the teeth must be acted on to bring the two strap pieces apart at the end of the heel and toe knitting, the two strap pieces will overlap, and the roller, 31, held up, so that in the movement above described the lever, 27, will strike angle piece, 30, which will strike lug, 50, and rock shaft 39. The rocking of shaft 39 causes crank arm 41 to strike lever 44, forcing it in alignment with pins, 43, on gear $j^3$ which then strike lever 44, forcing it down against the shifting bar, forcing the shifting bar down in alignment with the orifice in the frame of the machine, and the spring 48 forces said bar into said orifice disengaging the machine from the source of power.

Under normal conditions, the operation is as follows: When the heel and toe work is to commence the strap pieces are apart, the roller down, and the lever 27 away from the cylinder. The first movement causes the lever to move toward the cylinder, the action of the pawls in the first rack teeth releases the strap pieces from the pins, 37, and they, by action of springs 34, are brought together, elevating the roller, and the straps remain in this position until the pawls act on the last teeth at the end of the knitting of the heel and toe, when the pins, 37, pull the strap pieces apart and the roller drops down, bringing the angle piece, 30, out of alignment, so as not to be struck by the lever 27 when it moves away from the cylinder when the shafts are shifted, as before described; but, if for any reason, all the teeth in both rack plates should not be acted on, then the strap pieces will not be separated at the end of knitting the heel or toe, and the angle piece 30 will be struck by lever 27, stopping the mechanism as before described.

In order to automatically stop the machine when, for any reason, such as breaking the thread, the goods fall from the machine, I provide the following mechanism: 51 is a grooved wheel on shaft 52 and around which the goods, 53, are adapted to be wound. 54 is a pulley loose on shaft 55, and a belt 60 passes around said pulley and the driving shaft. Around the shaft 52 and against said pulley 54 is the spring 56. 57 is a nut (the end of shaft 52 being threaded) to regulate the spring pressure against said pulley. Upon the shaft, 52, and resting against the pulley, 54, and wheel, 51, is a friction wheel, 58, and by regulating the power of spring 56 sufficient friction is obtained to revolve the wheel, 51, and keep a tension upon the goods, 53, but not sufficient to pull the goods from the machine. 158 is a roller resting against the goods, 53, the roller being on the arm, 59, the arm, 59, being bent vertically, as shown in Fig. 4, and at a higher level than roller, 158, being bent again horizontally and passing through a sleeve, 60, supported by bracket, 61. 62 is a pin passing through the horizontal portion of arm, 59. 63 is a slot in sleeve, 60, corresponding to pin, 62. 64 is a spring wound around the end of the upper horizontal member of arm, 59, one end connected to said arm, the other end to sleeve, 60. When the parts are in the position shown in Fig. 4, the pin 62 lies across the slot 63 and the spring 64 is acting as a compression and torsion spring, the goods preventing the roller, 158, from swinging, but, if for any cause the goods should fall off, the spring will cause the roller to swing, revolving the arm, 59, so that the pin will register with slot 63, when the spring, 64, draws it in, causing the end of the upper horizontal member of arm, 59, to strike lever 44, forcing it into alignment with pins 43 or gear $j^3$, and the lever is forced downward against the shifting bar, stopping the mechanism as before described.

Having now fully described my invention, what I claim, and desire to protect by Letters Patent, is—

1. The combination with rack plates and operating pawls, substantially as described, of metallic straps, and devices for causing each rack plate to engage a metallic strap, said straps adapted to overlap each other, said devices being arranged substantially as described whereby at the end of the operation of the pawls if the pawls operate upon all the teeth the straps will be separated, a source of power, and intermediate devices substantially as described between said straps and the source of power, mechanism adapted to operate said devices in its movement when the straps overlap, and means to throw said mechanism into action at the end of the operation of said rack plates upon the straps, whereby when at the end of the operation, if the straps overlap, the mechanism is stopped.

2. The combination with rack plates and operating pawls, substantially as described, of metallic straps, and devices for causing each rack plate to engage a metallic strap, said straps adapted to overlap each other, said devices being arranged substantially as described whereby at the end of the operation of the pawls if the pawls operate upon all the teeth the straps will be separated, a knitting cylinder, a rotary shaft, an oscillating shaft, mechanism to cause said cylinder to be operated by the rotary and oscillating shafts, a lever operated by said mechanism, a trip one end of which is adapted to rest upon the straps, the other end being in the line of movement of the lever when the other end rests on the straps, and intermediate devices between said trip and the source of power whereby at the end of the operation if the trip rests upon the straps the mechanism is stopped.

3. The combination with rack plates and operating pawls, substantially as described, of metallic straps, said straps adapted to overlap each other, a pin upon each plate, one end of said straps being in line of movement of said pin; said pins being so placed that if the pawls operate all the teeth on the racks the straps will be struck by said pins and carried apart, a source of power, and intermediate devices substantially as described between said straps and the source of power mechanism adapted to operate said devices in its movement when the straps overlap, and means to throw said mechanism into action at the end of the operation of said rack plates upon the straps, whereby when at the end of the operation if the straps overlap the mechanism is stopped.

4. The combination with rack plates and operating pawls, substantially as described, of metallic straps, said straps being adapted to overlap each other, a pin upon each plate, one end of said straps being in line of movement of said pins, said pins being so placed that if the pawls operate all the teeth on the racks the straps will be struck by said pins and carried apart, a knitting cylinder, a rotary shaft, an oscillating shaft, mechanism to cause said cylinder to be operated by the rotary and oscillating shafts, a lever operated by said mechanism, a trip one end of which is adapted to rest upon the straps, the other end being in the line of movement of the lever when the other end rests on the straps, and intermediate devices between said trip and the source of power whereby at the end of the operation if the trip rests upon the straps the mechanism is stopped.

5. The combination with rack plates and operating pawls, substantially as described, of metallic straps, said straps adapted to overlap each other, a pin upon each plate, one end of said straps being in line of movement of said pins, said pins being so placed that if the pawls operate all the teeth on the racks the straps will be struck by said pins and carried apart, a knitting cylinder, a rotary shaft, an oscillating shaft, mechanism to cause said cylinder to be operated by the rotary and oscillating shafts, a lever operated by said mechanism, a trip one end of which is adapted to rest upon the straps, the other end being in the line of movement of the lever when the other end rests on the straps, a shaft adapted to rock, a lug on said shaft in line with the end of said trip when it rests on said straps, a crank connected to said shaft, a pivoted lever one end in line with said crank, a shifting bar in alignment with the other end of said lever, and a gear provided with pins against which the lever is forced when the shaft rocks.

6. In a knitting machine, the combination of the means to hold the goods under tension, a lever arm adapted to swing provided with two horizontal members and a vertical member connecting them, one horizontal member adapted to rest against the goods, a sleeve through which the other member passes, a slot in said sleeve, a pin on the lever arm in line with said slot, a spring one end connected to the arm the other end to the sleeve, a source of power, and intermediate devices between the arm and the source of power, the arrangement being such that when the arm is held by the goods the pin is across the slot, and the spring is a torsion spring, but when the goods are released the arm swings, the pin is in line with the slot and the spring carries it inward.

7. In a knitting machine, the combination with means to hold the goods under tension, a lever arm adapted to swing provided with two horizontal members and a vertical member connecting them, one horizontal member adapted to rest against said goods, a sleeve through which the other member passes, a slot in said sleeve, a pin on the lever arm in line with said slot, a spring one end connected to the arm, the other end to the sleeve, the arrangement being such that when the arm is held by the goods the pin is across the slot, and the spring is a torsion spring, but when the goods are released the arm swings, the pin is in line with the slot and the spring carries it inward, a lever one end in alignment with the arm, a shifting bar in alignment with the other end of said lever, a gear wheel and pins on said wheel, the arrangement being such that when the spring draws the arm in, the lever is forced against the pins and strikes the shifting bar, shifting the clutch.

In testimony of which invention I have hereunto set my hand.

HARRY A. HOUSEMAN.

Witnesses:
GEO. W. REED,
FRANK S. BUSSER.